May 21, 1940.    F. T. HAGUE    2,201,580
COPPER OXIDIZING FURNACE
Filed Dec. 22, 1938    5 Sheets-Sheet 1

Fig.1.

WITNESSES:
C. J. Weller.
B. L. Zangwill

INVENTOR
Floyd T. Hague.
BY O. B. Buchanan
ATTORNEY

May 21, 1940.  F. T. HAGUE  2,201,580
COPPER OXIDIZING FURNACE
Filed Dec. 22, 1938   5 Sheets-Sheet 2

WITNESSES:
C. J. Weller
B. L. Zangwill

INVENTOR
Floyd T. Hague.
BY O. D. Buchanan
ATTORNEY

May 21, 1940.  F. T. HAGUE  2,201,580
COPPER OXIDIZING FURNACE
Filed Dec. 22, 1938   5 Sheets-Sheet 5

WITNESSES:
C. J. Weller.
B. L. Zangwill

INVENTOR
Floyd T. Hague.
BY O. B. Buchanan
ATTORNEY

Patented May 21, 1940

2,201,580

UNITED STATES PATENT OFFICE

2,201,580

COPPER OXIDIZING FURNACE

Floyd T. Hague, Drexel Hill, Pa., assignor to Westinghouse Electric & Manufacturing Company, East Pittsburgh, Pa., a corporation of Pennsylvania Application December 22, 1938, Serial No. 247,199

16 Claims. (Cl. 13—20)

My invention, in its broader aspects, relates to a construction of, and details for, a furnace or apparatus having an interior chamber in which a charge is to be heat-treated while enveloped by a continuously-supplied gaseous atmosphere, the atmosphere preferably having constituents which react with the charge. In a specific embodiment of my invention, a furnace is provided of reasonable size for the treatment on a commercial scale of batches of suitably-prepared copper blanks heated to approximately 1025° C. while enveloped with a sufficiency of suitably-prepared air whereby to convert the surfaces of the blanks to red copper-oxide to the end that the blanks may ultimately be employed in rectifiers of the dry copper-oxide type, this heat treatment being a step in a complete process for treating such blanks for use in rectifiers as more fully disclosed and claimed in application, Serial No. 247,198, filed April 11, 1939, jointly by Frank Conrad, Earl D. Wilson, Carl C. Hein and myself.

In general, because of its extremely low density, an exceptionally large relative volume of gas is required to carry out reactions with solids and liquids, and this condition is aggravated when the reaction is carried out at high temperatures and substantially normal pressures. To be commercially and economically practical, therefore, a furnace for carrying out the aforedescribed oxidizing step should not only be capable of heating a good-sized batch of copper blanks to the necessary temperature, but should also be capable of preheating the large volume of air necessary to satisfactorily oxidize the surfaces of the blanks of each batch. For this purpose, my invention provides a reasonably-sized furnace in which all space may be efficiently utilized and which is fully capable of handling and effectively preheating the requisite large volume of air, and with a suitable overabundance to secure proper and uniform oxidation of the exposed surfaces of each of the copper blanks.

To carry out the oxidation in the most effective manner, it is preferable that the incoming air be preheated to a temperature substantially equal to, or even above that of the copper blanks, and to this end, the incoming air is tortuously piped, in the heating chamber of my novel furnace, along the side walls and across the bottom wall, and is then discharged at the bottom of the furnace through a large number of small holes which produce a turbulent flow of air for completely enveloping and contacting each blank of the batch being processed. For maximum efficiency the pipes occupy the entire available area on the side and bottom walls of the furnace, and are positioned in close heat-exchange relation with the heating elements therein.

The pipe assembly is of heat resistant metal but, at an operating temperature of approximately 1000° C., it may be desirable to provide supporting means for the pipes. Accordingly, I have provided a grid framework or rack having ribs or ledges which support the pipes, at least in part. This framework is further utilized to support the side heating units which are in the form of resistance elements, so that a compact arrangement of all the parts within the furnace results, and a relatively small-sized furnace, economical both from the viewpoint of initial cost and operating costs, suffices for large scale production of oxide-coated copper blanks.

In accordance with my invention, I supply outlet means for the large supply of air to the relatively small heat chamber, the outlet means taking the particular form of as many stacks as are necessary at the top of the furnace, and each equipped with an automatic damper balanced to open with a very slight air pressure on the inside of the heat chamber, and to close as soon as the air supply to the heat chamber ceases, thus conserving the heat in the heating chamber. To further reduce the possibility of heat losses, the outlet passage or passages through the top walls are made crooked so that radiant heat cannot flow in a straight line through the passage. To reduce the temperature of the outgoing gases, and to decrease the operating expenses of the furnace, the output stacks are preferably constructed as part of heat-exchangers which convert the heat of the outgoing gases to a useful purpose. The heat-exchanger may be employed to partially preheat the incoming air, or the heat-exchanger may take the form of a water jacket.

Many other novel features, details, elements, combinations and objects of my invention will be apparent from the following description thereof taken in conjunction with the drawings, in which like reference numerals designate like parts, and in which.

As is customary in the construction of furnaces, my furnace comprises a bottom wall 2, side walls 4 and 6, end walls 8 and 10, and a top wall 12. The walls are, in general, built in accordance with usual practice and consist of refractory brick, defining the heating chamber 14 of the furnace, and suitable insulating brick, and perhaps mineral wool, providing the necessary heat insulation at the outside portions of the furnace walls. A fabricated metallic shell 16 encases the brickwork to make the furnace impervious to the leakage of gas.

The end walls are formed with suitable openings 18 and 20 for the purpose of permitting the insertion and withdrawal of the charges to be heat treated in the furnace, these openings being controlled by suitable closures in the form of doors 22 and 24.

To facilitate the movement of the charge into and out of the furnace, rails 26 and 28 are provided, running the length of the furnace and supported upon a plurality of arch members 30 of heat resistant metal, and each having downwardly-extending, spaced legs 32, 34 and 36. The legs terminate in base plates 38 which are embedded in the bottom wall 2 of the furnace so that a substantial and secure supporting means is provided for the rails 26 and 28. As shown, the rails ride in suitable grooves in the supporting members 30 and may also be almost completely embedded in the end walls 8 and 10 at the bottom of the openings 18 and 20 with only their top sliding faces protruding, all for the purpose of obtaining a rigidity of structure.

In the particular furnace being described, the charges are preferably conveyed through the furnace by means of a conveyor belt riding in a channel 40 supported by the arch members 30 and the bottoms of the end walls 8 and 10 in the same manner as the rails 26 and 28.

I prefer to operate the furnace in such manner that the charge travels therethrough in a single direction. For example, a new charge or batch may be inserted through the opening 18 while the treated charge or batch in the furnace is removed through the opening 20, the doors 22 and 24 being suitably operated to enable a rapid removal of the treated charge and insertion of the untreated charge. However, it is obvious that a single opening may be employed for both the insertion and removal of the charge if such be desired, furnaces of this character being well known to the art.

To raise the temperature of the batch rapidly I provide heating units on the sides, top and bottom walls, these units being preferably in the form of resistance ribbons suitably shaped in accordance with common practice. The bottom heating unit is supported on a plurality of refractory tile members 42 embedded in the bottom wall 2 of the furnace and projecting upwardly therefrom almost to the bottoms of the rails 26 and 28, and the channel 40. The upper portions of the heater supporting tiles 42 are formed with teeth 44 to provide a comb effect within the slots of which lie the ribbon portions 46 of the bottom heating unit. The heating unit is conventionally formed, the ribbon being sinuously-shaped to fit in the diverse slots of the combs of the refractory tiers 42, and preferably covering the available area at the bottom of the chamber 14, the sides of the convolutions of the heating unit being properly spaced to clear the heat resistant, metallic arch members 30. The bottom heating unit terminates at each end in suitably-insulated terminals 48 and 50 for connection to a source of electrical energy.

It may be observed at this point that the refractory tiers 42 and the legs of the arch members 30 are so disposed as to provide lengthwise-running spaces in which lie pipes of an air-preheating pipe system, the bottom heating unit being supported by the tiers 42 at a sufficient height above the bottom wall 2 to clear the pipe system as will be hereinafter described in greater detail.

The top heating unit comprising two portions, series connected and each sinuously-formed with the individual ribbon sides resting in the slots of comb tile 52 supported in suitable channels in two top or upper frameworks, each indicated in their entirety by the reference numeral 56. Each top framework is held in suspended position by means of suspension rods 58 extending through apertures 60 at each corner of the framework 56 and through suitable apertures in steel cross-members 62 resting on angles 64 welded or otherwise secured to the side of the metallic shell 16. Appropriate nuts 66 are screwed on each end of the supporting rods 58 to provide the necessary holding means for maintaining the framework in proper suspended position.

In Figs. 3, 4, 5 and 6, a top framework is shown in greater detail, and it may be observed that each top framework 56 comprises three parallel channel-like members 70, 72 and 74 arranged in spaced relation, the heating unit supporting tile 52 being adapted to fit into these channels. In order to supply the necessary strength to the top member, the center portions of the channels are deepened, as at 76, and the inside of each channel is provided with upwardly-directed lugs 78 of such height that their tops will be substantially in a straight line to form a rest for straight-bottomed tiles 52.

The channels 70, 72 and 74 are integral with end portions 80 at each end of the framework 56 so that a unitary grid-like framework of substantial strength is obtained; suitable inside and outside re-enforcing webs 82 and 84, respectively, further strengthening the member.

In the specific embodiment described, the two top frameworks extend laterally of the furnace (and by laterally I mean in a direction at right angles to the direction of movement of the charge) so that the end portions 80 are in proximity to the side walls 4 and 6. Projecting laterally from the corners of each framework 56 are lugs 86 which, in conjunction with the webs 84, form shoulders 88 for a purpose which will later become apparent.

Power may be supplied to the top heating units in any suitable manner, insulated leads and terminals 89 extending through the top wall for the purpose.

Figure 1:
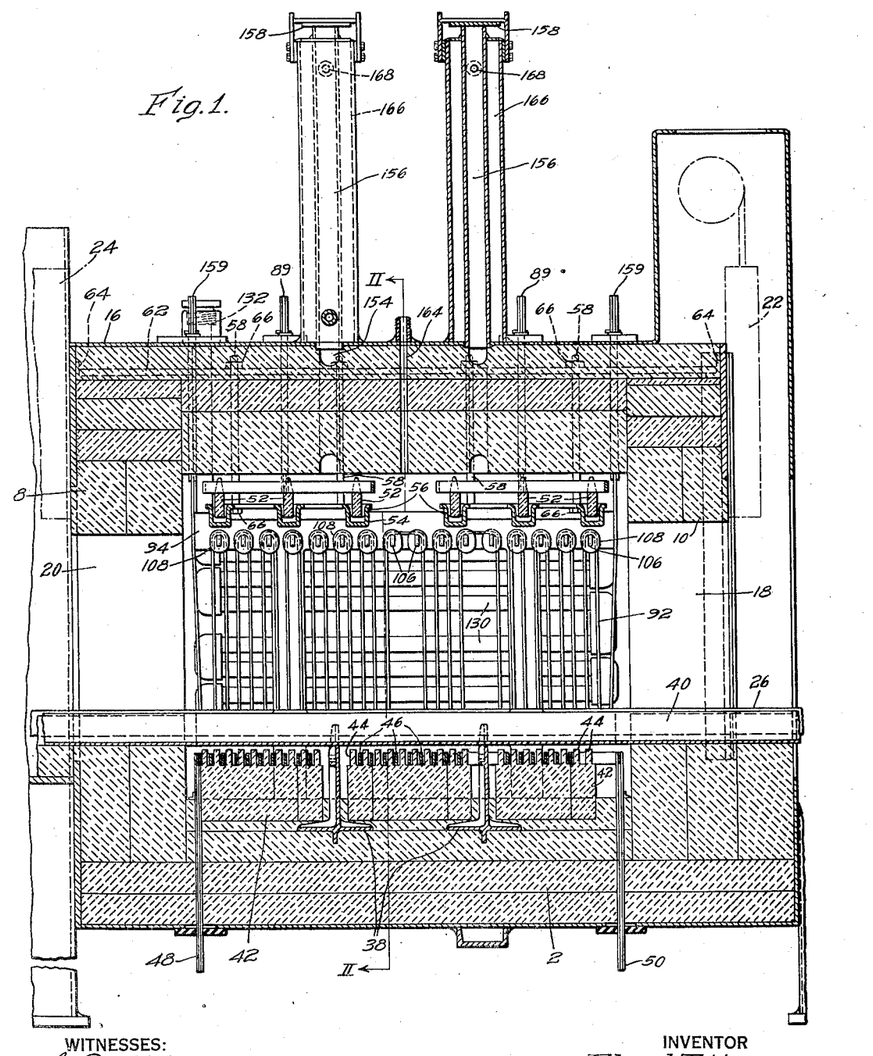
Figure 1 is a longitudinal sectional view of my novel furnace on a small scale.
Figure 2:
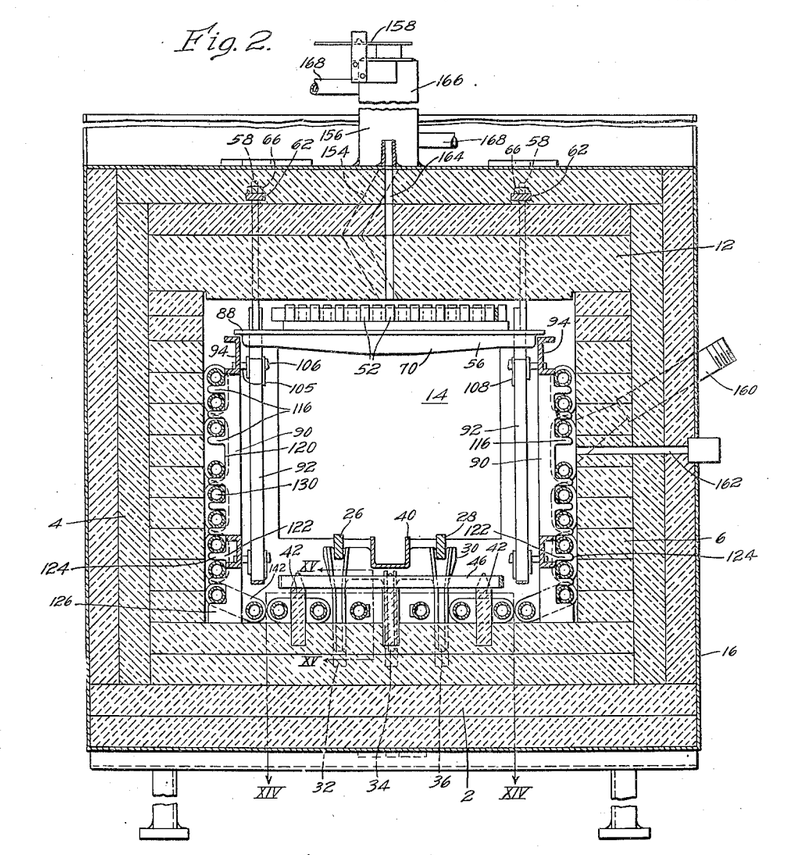
Fig. 2 is a transverse sectional view of the furnace on the line II—II of Fig. 1.
Figures 3, 4:
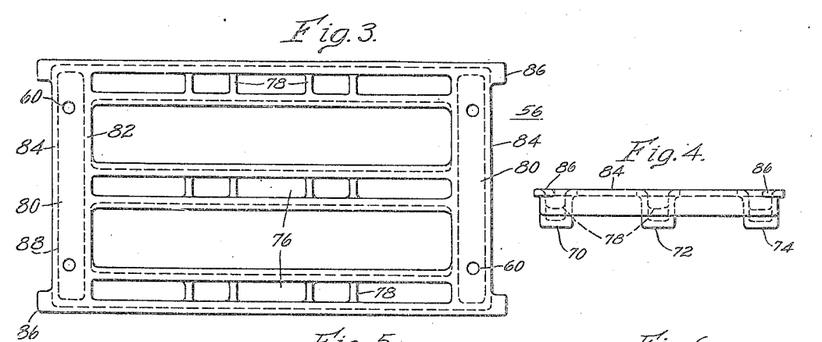
Fig. 3 is a top view of the top heater unit supporting-framework, there being two such upper frameworks in the furnace.
Figs. 4 and 5 are end and side views, respectively, of the top framework of Fig. 3.
Figures 5, 6, 7, 8, 9:
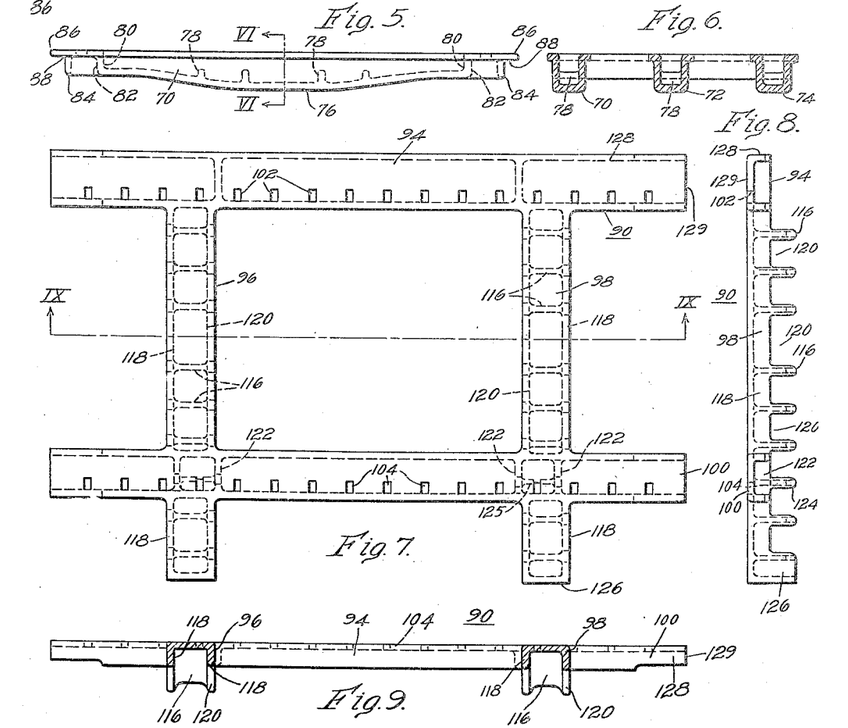
Fig. 6 is a sectional view of the top supporting-framework along the line VI—VI of Fig. 5.
Fig. 7 is a front side view of a supporting-framework for the side heater units and the air preheating pipes, there being one such framework on each of the two sides of the furnace.
Fig. 8 is an end view of one of the side supporting-frameworks.
Fig. 9 is a sectional view on the line IX—IX of Fig. 7.

At each side of the heating chamber 14, a side framework 90 is provided and is shown in greater detail in Figs. 7, 8 and 9. This supporting framework serves to support a side heating unit 92 and a portion of one air preheating pipe system.

The appurtenances at each side of the heating chamber 14, in my preferred construction, have the same general principles of design, excepting only that one is designed for one side of the furnace and the other for the opposite side and, therefore, may be said to have left and right-hand relationship with respect to each other. For the purpose of brevity and simplicity, therefore, a detailed construction of the appurtenances at one side of the furnace will suffice for an understanding of my invention.

The side framework 90 comprises an upper horizontal channel 94 integral with spaced, vertical channels 96 and 98. In order to proportion the load upon the vertical channel members 96 and 98, and also to provide the necessary end spaces for the turns of the pipe system to be later described, the vertical channel members are disposed equally distant inwardly from the extreme ends of the horizontal channel 94. A second integral horizontal channel 100 extends substantially the length of the framework and is disposed somewhat above the bottom of the vertical channels 96 and 98. Both horizontal channels are provided with a plurality of equally-spaced apertures 102 for the top channel and 104 for the bottom channel, the corresponding apertures of each channel being preferably vertically aligned.

Figure 10:
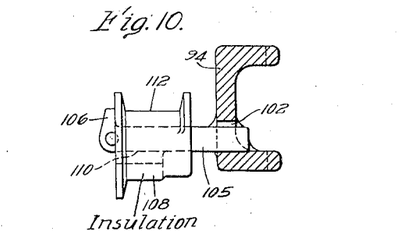
Fig. 10 is an enlarged detail view showing the construction of one of the side heater-unit hanging means for the side framework.
Figure 11:
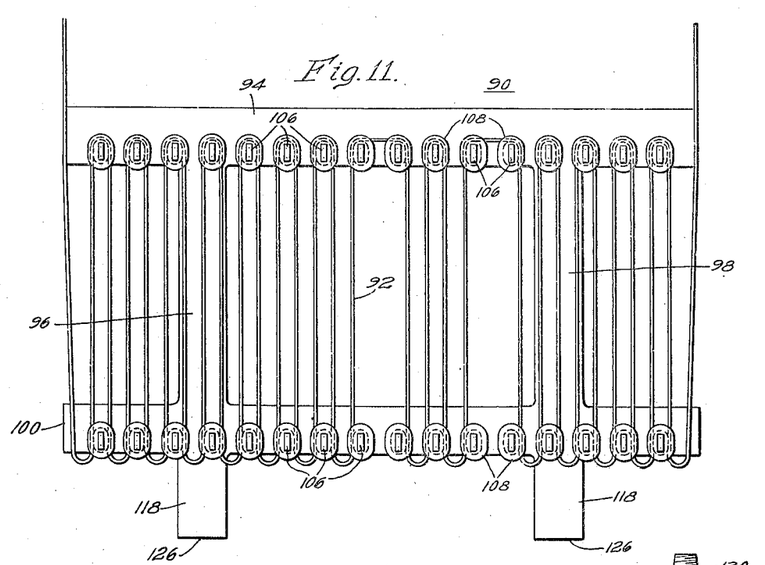
Fig. 11 is an elevational view of a side supporting-framework with a heater unit in position thereon, and looking toward a side wall of the furnace, the air preheating pipes being omitted.
Figure 12:
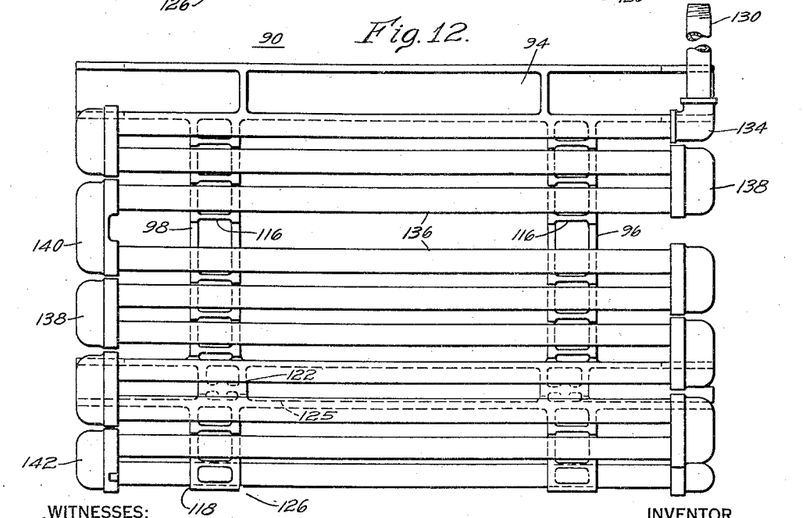
Fig. 12 is an elevational view of a side supporting-framework with the air preheating pipes in position thereon, and looking toward the center of the furnace, the heater-units being omitted.
Figure 13:
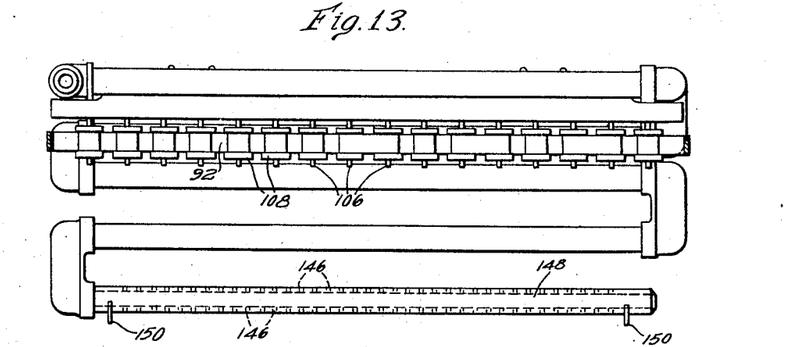
Fig. 13 is a top view of the side supporting framework with both the heater units and preheating pipes in position thereon.
Figure 14:
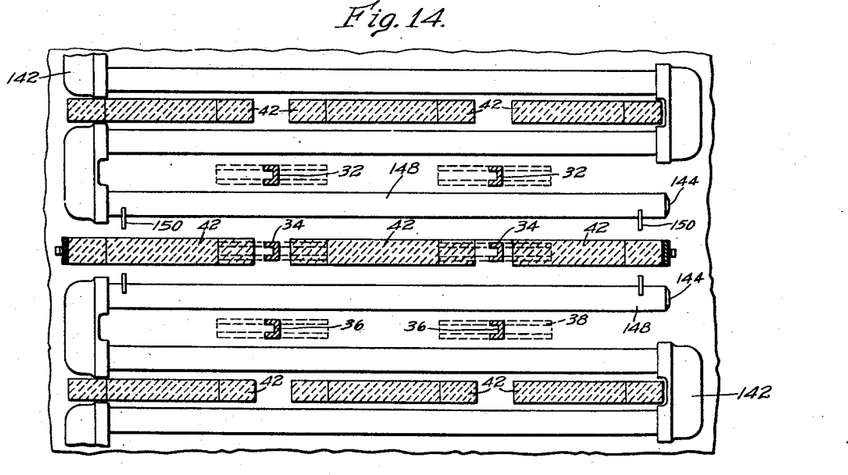
Fig. 14 is a sectional view taken on the line XIV—XIV of Fig. 2 showing the bottom arrangement of the preheating pipes.
Figure 15:
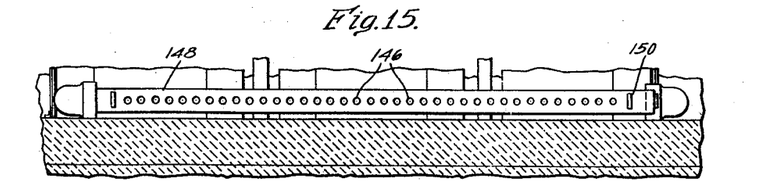
Fig. 15 is a sectional view of the line XV—XV of Fig. 2 showing a discharge end of the air preheating pipes.

For hanging and positioning the side heating units, a hook member is disposed in each of the apertures 102 and 104, and welded to the walls of the side supporting framework about the aperture as shown in Fig. 10. The hook member has a horizontally extending bar portion 105 terminating in a hook 106 which serves to lock a spacer 108 of heat resistant insulating material. The spacer 108 has an elongated aperture 110 large enough to permit the spacer to be passed over the hook 106 and then dropped upon the bar portion 105 of the hook member. In this manner, the hook 106 maintains the spacer 108 in position upon the bar portion 105 of the hook member. The spacers 108 are so formed as to provide outside grooves 112 into which the upper turns of the side heating unit 92 seat.

The vertical channels 96 and 98 are each provided on the side toward the side furnace wall with projecting horizontal pipe-supporting ledges 116, the corresponding ledges on the two channels being aligned horizontally. These projections extend a sufficient distance beyond end webs 118 of the vertical channels to provide between any two adjacent ledges 116, the necessary concavities 120 into which the individual pipes of the pipe-system may be set.

It may be observed that the side webs 118 are discontinuous where the vertical channels intersect the horizontal channel 100, and as a substitute within this area, vertical webs 122 are provided. The purpose of this construction is to assure that the webs 122 are disposed centrally between adjacent apertures 104 to prevent localized overstresses in the side framework. To provide a horizontal pipe-supporting ledge 124 in this area, an additional integral web 125 projects from each of the facing sides of the webs 122 terminating approximately at the periphery of the interposed aperture 104, and extending beyond the webs 122 and outwardly in the same direction as the ledges 116, and for the same distance.

The side framework 90 is placed in position in the furnace with the ledges 116 extending toward the side wall and in close proximity thereto. The side framework is provided with legs 126 as part of each of the vertical channels, and these legs rest upon the bottom wall 2. An upper web member 128 and connecting member 129 of the upper horizontal channel 94 form a corner which nests in shoulder 88 in the top framework, and in this way the side framework is maintained by its own weight in its position juxtaposed to the side wall. It should be noted, however, that sufficient clearance should be provided between the top corner of the side framework and the shoulder 88 to permit of the necessary expansion and contraction of the parts with changes of temperature.

The pipe system for preheating the air comprises an assembly of pipes shown more particularly in Figs. 1, 2, 12 and 14. The pipe system lies essentially in two planes, one vertical bank which rests upon the horizontal ledges of the side framework, and one horizontal bank which rests upon the base wall. The pipe system comprises a sinuous or tortuous assembly of pipes and bends whereby the air to be supplied to the heating chamber is made to flow through a sufficiently long path in proximity to the heating units so that the air is adequately preheated, and includes a vertical pipe 130 extending from an inlet 132 through the top wall of the furnace to an elbow 134 to which is connected the sinuous assembly which comprises a series of horizontal pipes 136 joined at their ends by return bends 138 to provide a continuous, elongated path for the flow of air along which it is preheated. There are as many horizontal pipes as there are horizontally-aligned pairs of ledges 116 and 122 on a side framework and in the specific embodiment shown, there are nine horizontal pipes each resting on a pair of aligned ledges of the vertical channels 96 and 98.

One of the intermediate return bends 140 is made larger than the others to provide a wider spacing thereat between the two pipes connected thereto for the purpose of permitting a thermocouple to be inserted between the pipes. the ledges 116 upon which these latter pipes rest being suitably spaced to correspond.

Connected to the bottom pipe of the vertical bank of the pipe system is a bend 142 which is angularly disposed and connects to the horizontal bank of pipes which rests on the bottom wall. In the bottom plane, the pipe-system continues its sinuous form with the tiers 42 disposed within one of the convolutions of the system, and the end legs of the arch members 30 disposed within an adjacent convolution, as more particularly shown in Fig. 14.

The bottom bank of pipes of each side system covers approximately one-half of the available area at the bottom of the heating chamber and the end of the system is closed by a plug 144, the air discharging into the chamber through a series of small holes 146 in the end pipe 148. In order to assure that these discharge openings will not be closed if the pipe system should distort to an extreme extent where the end pipe 148 would abut the central tiers 42, spacing members 150 are welded to each extremity of the pipe 148 at the side adjacent the tiers. No spacing members similar to 150 are provided on the opposite side of the pipes 148 inasmuch as the legs 32 and 36 of the arch member 30 will prevent excess displacement of the pipe 148, and since these leg members occupy but little space, contact between these parts cannot seriously interfere with the discharge of the air from the side of the pipe toward the outer legs of the arch members 30.

It may be observed that the discharge openings for the pipe system are disposed substantially centrally of the chamber and because of the number of small holes 146, the discharging air is well dispersed and will flow upwardly completely to envelope any charge resting on the rails 26 and 28.

In accordance with the primary use of my furnace, a large volume of gaseous atmosphere is necessary to provide the requisite amount of reacting constituents, and this usually requires that the fresh gaseous atmosphere be continuously supplied to the heating chamber while the atmosphere that has served its purpose flows out of the heating chamber. In the particular embodiment shown, the fresh air discharges into the heating chamber from the preheating pipes under a slight pressure, and drives the expended atmosphere out through outlet passages 154 extending through the top walls, and leading to outlet stacks 156, the tops of which are covered by dampers 158 pivoted slightly beyond the center of gravity in such manner that the dampers normally tend to close the discharge openings of the pipes 156. Of course, a slight leakage may be made to take place through the seals of both doors, but such leakage is, preferably, made negligible compared to the volume of air flowing out of the stacks.

It is obvious that when charges are being removed from the furnace and new ones inserted, it may be preferable to shut off the supply of air by any appropriate manual or automatic means and during this process, closure of the dampers 158 prevents undue drafts as well as loss of heat. To further reduce loss of heat by radiation, the passages 154 are preferably bent or otherwise twisted to the end that radiant heat cannot find a straight-line path therethrough.

The side heating units are formed in the customary manner for resistance ribbons, each in a sinuous form with the turned ends on the upper sides resting in the channels 112 of the spacers 108, the lower bends being disposed between two adjacent spacers. I prefer this construction to a construction in which the lower openings 104 of a side framework are alternately disposed with respect to the upper openings 102, rather than aligned, as shown. In the former construction, it is necessary to have a lower bend go around a bottom spacer, whereas in the preferred construction the lower bends are maintained in position between two adjacent spacers. Since the bends may tend to flatten out during the heating processes, two adjacent ribbons cannot short in my preferred construction whereas in the alternative construction, such shorting sometimes occurs, particularly where the bends are sharp and the spacing of the ribbons small to provide the necessary length of resistance ribbon for the available space. The side heating units end at at terminals 159 to which a source of electrical energy can be connected for supplying power to the unit.

As further adjuncts to the furnace, a peep hole 160 extends through a side wall, for example wall 6, and terminates in the extra wide space between the pipes connected to the bend 140, and a correspondingly extra wide space deliberately formed in the side resisting unit 92, for permitting an unobstructed view of the interior of the furnace. In the same way thermocouple passages 162 in the side wall 6, or 164 in the top wall 12, terminate opposite the similarly formed wide spaces in the vertical bank of the pipe system, and the side heating unit 92 or between the two top frameworks, so that a more accurate temperature reading of the actual conditions in the heating chamber 14 may be obtained.

For regulating the heating of my furnace, I prefer to provide a two-zone control wherein the side heating units are controlled automatically by a thermocouple that may be disposed in the passage 162 and the top unit heating units are controlled by a second thermocouple disposed in the passage 164. The bottom heating units may be made to operate with either the side or top units whichever may be found to yield the better results in actual operation.

In operation of the furnace, electrical energy is supplied to the heating units to raise the temperature of the heating chamber 14 to the proper value. The air to be preheated is conveyed under pressure to the inlet 132 from whence it flows generally downward through the sinuous vertical banks of the two side pipe-systems, then through the horizontal banks of the systems and is discharged at the central portion of the furnace through the openings 146 in the end pipes 148. Two air inlets 132 may be provided for each of the side pipe systems or, if desired, a branch connecting pipe may run from the inlet 132 to the side pipe system not directly connected thereto. After enveloping whatever charge may be in the heat chamber 14 and contacting therewith to an appreciable extent, the atmosphere flows out through the passages 154 and pipe 156, the pressure of the air being sufficient to raise the dampers 158.

Inasmuch as the heating chamber is operated at a relatively high temperature in the neighborhood of 1000° C. it is desirable, for the sake of efficiency, to recover as much heat from the outflowing atmosphere as possible, and to this end heat-exchange jackets 166 are constructed about the outlet pipes 156, these jackets having inlet and outlet pipes 168. The construction of the pipe 156 and the jacket 166 is a matter of choice and may follow the usual principles by which an efficient heat exchange is effected between the fluids flowing therein. If desired, these jackets may be supplied with cold water for the purpose of absorbing the heat of the outflowing gases, or preferably the incoming air to the inlet 132 may be first passed through these jackets to absorb whatever heat they can from the outflowing atmosphere.

In accordance with the foregoing, I have provided a furnace under which the side and bottom walls are covered substantially for their entire area with heating units so that a high temperature can be created in a relatively small heating chamber. Moreover, the air preheating pipes are in close proximity to the heating units so as to rapidly absorb heat. By providing a sinuous path within the chamber itself, I am able to preheat a large volume of gaseous atmosphere to a temperature approximating that at which the charge is to be heat treated, although it is obvious that the degree of preheat can be controlled by controlling the volume of air flowing through the pipe system or by shortening the path through which it flows by decreasing the number of convolutions in the pipe system. However, I prefer to raise the temperature of the incoming air to a value equal to or somewhere above the value the charge is to attain so that the charge may be quickly brought up to its temperature by a combination of radiant heat from the heating units and convection from and contact with the preheated air.

In the specific process of oxidizing the surfaces of copper blanks, it is preferable to carry out the reaction of the oxygen in the preheated air with the copper in the blanks at as high a temperature as possible. By preheating the air, as I do in this furnace, to the temperature at which the reaction takes place most efficiently, it has been found that the most satisfactory results are obtained, as more fully explained in the hereinbefore-mentioned application.

While I have illustrated my invention in the form which I now believe to be the best mode of application thereof, it is obvious that many changes may be made within the spirit and scope of the principles thereof. It is desired, therefore, that the appended claims be given the broadest construction, and limited only by the prior art.

I claim as my invention:

1. In a furnace of the type in which a charge is to be heat-treated while enveloped by a copious supply of a gaseous atmosphere having constituents for reacting with the charge, walls defining a heat-treatment chamber, heating means in said chamber substantially parallelling one of said walls, an inlet to said chamber for a gas supply, a compact, metallic pipe system in said chamber for conveying the gas from said inlet in a tortuous path whereby the gaseous supply is preheated, said pipe system having discharge means for discharging the gaseous atmosphere into said heating chamber, and outlet means from said chamber for the gaseous atmosphere in the said chamber, said pipe system being interposed between the last said wall and said heating means.

2. For an electric furnace of the type described and having a heating chamber, a supporting framework in said chamber, heating means for said chamber, means to support said heating means on said framework on one side of said framework, gaseous atmosphere preheating pipe means, and means to support said pipe means on said framework on the opposite side of said framework.

3. For an electric furnace of the type described, a supporting framework comprising horizontal and vertical members, an electric heating unit, means cooperating with a said horizontal member for supporting said heating unit, a gas-preheating pipe means, and means cooperating with said vertical member for supporting said pipe means.

4. For an electric furnace of the type described, a vertical, heat-resistant, metallic, open gridwork, heating means, means for supporting said heating means on said gridwork at one side thereof, gas-preheating pipe means, and means for supporting said pipe means on said gridwork at the other side thereof.

5. For a supporting heating means and a gas-preheating pipe system in an electrical furnace, a framework of metal, and comprising spaced horizontal members and spaced vertical members, said horizontal members having means for supporting heating means at one side thereof, said vertical members being formed at the side opposite said one side with spaced substantially horizontal pipe-supporting ribs, said horizontal members having integral therewith reinforcing webs.

6. In a furnace of the type in which a charge is to be heat-treated while enveloped by a gaseous atmosphere, a top, bottom, side and end walls defining a heat-treatment chamber, a gaseous atmosphere inlet to said chamber, a pipe system from said inlet, and comprising a sinuous arrangement of pipes substantially in two planes, a framework disposed along a wall of said chamber, means for supporting the pipes of one plane on said framework, the pipes of said other plane supported on said bottom wall, and heating means for said chamber disposed adjacent said pipes on the side away from the last said wall.

7. In a furnace of the type in which a charge is to be heat-treated while enveloped by a gaseous atmosphere, a top, bottom, side and end walls defining a heat-treatment chamber, a gaseous atmosphere inlet to said chamber, a pipe system from said inlet, and comprising a sinuous arrangement of pipes substantially in two planes, a framework disposed along a wall of said chamber, means for supporting the pipes of one plane on said framework, the pipes of said other plane supported on said bottom wall, and small discharge openings in an end branch of last said pipes whereby gaseous atmosphere flowing through said pipe will be preheated and dispersed through said chamber and heating means for said chamber disposed adjacent said pipes on the side away from the last said wall.

8. In a furnace of the type in which a charge is to be heat-treated while enveloped by a gaseous atmosphere, walls, including a top, a bottom, and side walls, defining a heat-treatment chamber, a top grid-like framework suspended from said top wall, a grid-like side framework resting on said bottom wall, and in proximity and substantially parallel to a side wall, the two said frameworks having cooperating means at their proximate edges for maintaining the said side framework in position, the last said framework having pipe-supporting means extending toward last said side wall, and a gaseous atmosphere preheating pipe system comprising pipes supported on said supporting means.

9. The structure of claim 8 wherein said supporting means comprises substantially horizontal ledges extending substantially to last said side wall, and said pipe system including horizontal pipes resting on said ledges.

10. A furnace comprising walls defining a heat-treatment chamber, a horizontal member of heat resistant metal in said chamber, said member having spaced apertures lengthwise thereof, hanger elements in each of said apertures, each said element comprising a metallic bar extending into a corresponding aperture and secured in position on said member with a projecting portion, a hook at the end of said portion, an insulator for each said projecting portion, having a hole sufficiently large to pass over said head and then drop on said projecting portion, and electric heating means supported by said insulators out of contact with said member and bars.

11. In a furnace of the type in which a charge is to be heat-treated while enveloped by a copious supply of a gaseous atmosphere, a heating chamber comprised of a side wall and bottom wall, a gaseous atmosphere inlet to said chamber, a sinuous pipe system extending from said inlet, said sinuous pipe system being in said chamber adjacent the entire available area of said side wall, and having a portion supported by said bottom wall, said last portion having discharge holes through which the atmosphere discharges into the chamber, and heating means close to the side of said pipes away from said side wall, and covering a substantial area thereof, and common means for supporting said heating means and pipe system.

12. The structure of claim 11 with additional heating means immediately above said portion of said pipe system.

13. In a heat-treatment furnace, a heating chamber comprised of a bottom wall, spaced vertical refractory tiles embedded in said wall and extending upward therefrom, heating means supported on the upper portions of said tiles, a sinuous pipe system having pipes in the spaces between said tiles, the said tiles being of such lengths and so disposed that the convolutions of said pipe system are continuous, said pipe system having discharge openings for discharging gaseous atmosphere into said chamber.

14. The structure of claim 13 wherein said openings are below said heating means and centrally of the chamber, and charge supporting means above said heating means.

15. An electric furnace comprising walls defining a heat-treatment chamber, having means for supporting a charge to be heat-treated in said chamber, heating means for heating said charge comprising heater-units disposed along one of said walls and supports for supporting said heater-units in spaced relation to said one wall, means to convey gas to said furnace to be discharged in said chamber and about said charge, the last said means including pipes through which the gas passes, said pipes being disposed in the space between said heater units and said one wall, said supports being open so that said pipes have substantial portions thereof directly exposed to the said heater-units.

16. In a furnace of the type in which a charge is to be heat-treated while enveloped by a copious supply of a gaseous atmosphere, said furnace comprising walls defining a heat-treatment chamber, an open framework inside said chamber substantially parallel to and in proximity to one of said walls, heating means for heating said chamber, supported on said framework on the side of said framework away from the last said wall, and a compact gas-preheating pipe system between said framework and the last said wall whereby said pipe system is interposed between the said heating means and the last said wall, and absorbs heat from said heating means.

FLOYD T. HAGUE.